United States Patent [19]

Steen

[11] 4,167,662
[45] Sep. 11, 1979

[54] METHODS AND APPARATUS FOR CUTTING AND WELDING

[75] Inventor: William M. Steen, Teddington, England

[73] Assignee: National Research Development Corporation, London, England

[21] Appl. No.: 890,304

[22] Filed: Mar. 27, 1978

[51] Int. Cl.² .............................................. B23K 9/00
[52] U.S. Cl. .......................... 219/121 L; 219/121 LM
[58] Field of Search ..................... 219/121 L, 121 LM; 58/115

[56] References Cited

U.S. PATENT DOCUMENTS

| | | | |
|---|---|---|---|
| 3,383,491 | 5/1968 | Muncheryan | 219/121 L |
| 3,604,890 | 9/1971 | Mulleney | 219/121 L |
| 3,632,205 | 1/1972 | Marcy | 219/121 L |
| 3,846,612 | 11/1974 | Augsburger | 58/115 |

FOREIGN PATENT DOCUMENTS

| | | |
|---|---|---|
| 953725 | 4/1964 | United Kingdom . |
| 1072570 | 6/1967 | United Kingdom . |
| 1215713 | 12/1970 | United Kingdom . |
| 1215714 | 12/1970 | United Kingdom . |

OTHER PUBLICATIONS

Mullins, Laser–Comes of Age, "Iron Age Metal Working Int.," Sep. 1970, 25–27.
Adams, Materials Working with Laser Beams Physics Bull, Jul. 1977.
Consalves et al., Cutting Thin Metal Sheets with CW $CO_2$ Laser, J. Appl. Phys., Nov. 1972, 4684–4687.
Locke et al., Deep Penetration Welding with High Power $CO_2$ Laser, Welding Research Suppl., May 1972.
Milner et al., Arc Characteristics & Their Significance, British Welding Journal, Feb. 1960.
Houldcroft, Gas-Shielded Arc Welding, Welding Processes, pp. 60–75.
Gas Tungsten-Arc Cutting, 43.24–43.29, Welding Handbook.
Gas-Shielded Arc Welding, Welding Metallurgy.

*Primary Examiner*—J. V. Truhe
*Assistant Examiner*—Fred E. Bell
*Attorney, Agent, or Firm*—Oblon, Fisher, Spivak, McClelland & Maier

[57] ABSTRACT

Methods and apparatuses for cutting, welding, drilling or surface treating a workpiece are described. A laser beam is directed towards a workpiece and an arc is struck between an electrode and the heat affected zone created by the laser beam in the workpiece.

33 Claims, 5 Drawing Figures

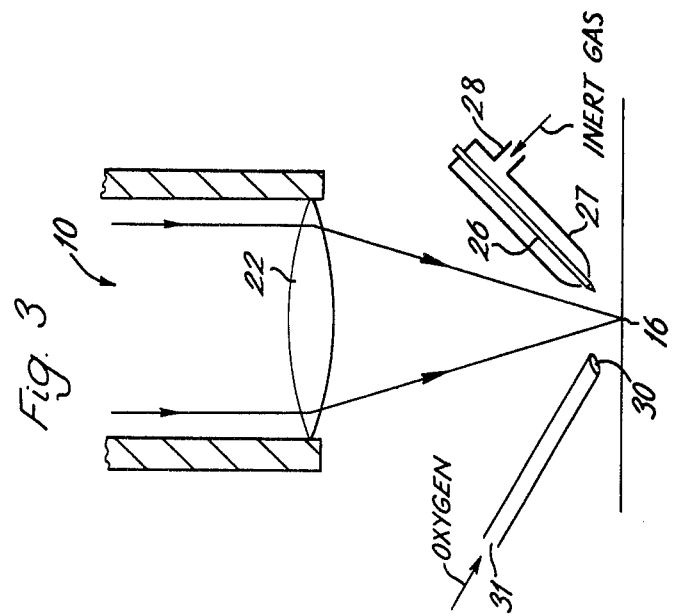
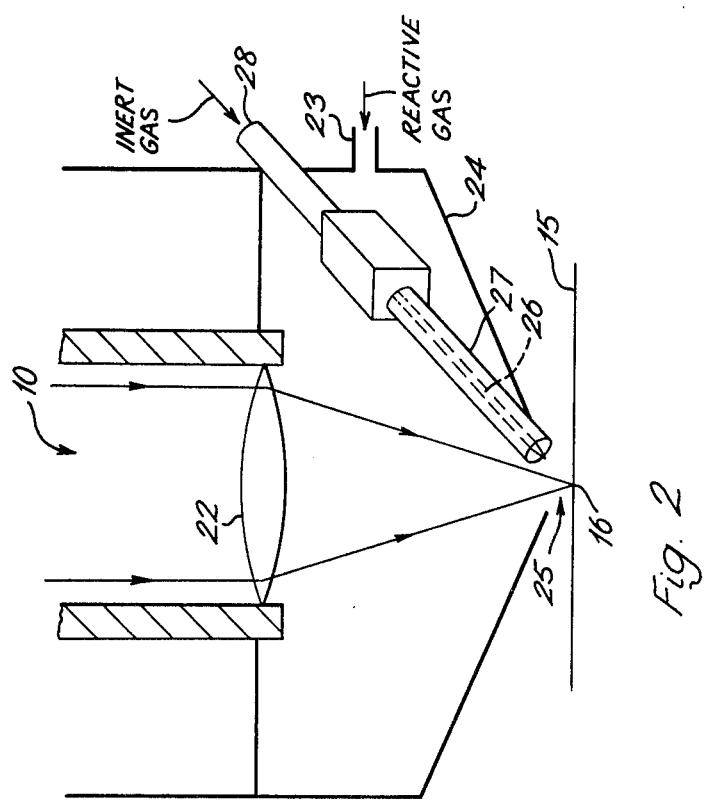

METHODS AND APPARATUS FOR CUTTING AND WELDING

BACKGROUND OF THE INVENTION

1. Field of the Invention

The present invention relates to methods and apparatus for cutting, welding, drilling or surface treating a workpiece using a laser.

2. Description of the Prior Art

At present such methods employ a lens or mirror system to focus the beam with the object of achieving a high energy intensity over a small area. A gas jet concentric with the laser beam has been found useful and an oxygen jet greatly increases the range of possible cutting speeds together with depths of penetration. The oxygen reacts with a metallic workpiece causing an enhanced energy flux. For non-metals an inert gas increases the cutting rate probably by blowing liquid material clear.

However, present cutting and welding speeds and the depths achieved are insufficient for the majority of applications. Recent studies using a 15-20 kW laser have resulted in performance figures well below those suggested by a linear extrapolation from low power work. This poor performance may be due to optical design, masking of the workpiece by the laser induced plasma (that is a cloud of vaporised particles some of which are electrically charged) or some other reasons. In any case it is primarily due to lack of energy reaching the workpiece and suggests that the way ahead for laser processes is not by way of higher laser powers.

SUMMARY OF THE INVENTION

According to a first aspect of the present invention there is provided a method for treating a workpiece, including projecting a beam of light from a laser on to a workpiece, and striking an arc between an electrode and the heat affected zone created by the laser beam in the workpiece.

The term "treating" in this specification includes cutting, welding, drilling, surface hardening, surface alloying and surface coating, and the word "workpiece," particularly in welding, include the plural.

The heat affected zone is that zone of the workpiece which is heated by the laser beam and wherein the temperature is 100° C. or more above the temperature of the material of the workpiece which is not heated by the laser beam. The heat affected zone is preferably regarded as that zone having a temperature of 300° C. or more above the material not heated by the laser beam.

The arc is on the same side of the workpiece as the laser beam unless the workpiece is sufficiently thin to allow the heat affected zone to extend to an opposite surface of the workpiece, when the arc may be struck to the zone on this surface. In these circumstances two arcs on opposite sides of the workpiece may be operated at the same time.

For cutting or welding the additional step of relatively moving the laser beam and the workpiece while maintaining the arc or arcs at the heat affected zone is required. The method of the invention can then alternatively be considered as a method of manipulating one or more arcs since as is mentioned below an arc root tends to some extent to follow the point of incidence of the laser beam on the workpiece. However in some cases, notably at high currents (for example 130 Amps), the arc may root anywhere in the heat affected zone.

A main advantage of the invention is that electrical power additional to the power from the laser beam is supplied to the workpiece, usually resulting in a weld with narrow heat affected zone and large depth to width penetration, similar to unaugmented laser welding.

Preferably a jet of gas from a nozzle is also projected at the heat affected zone. The gas may be inert or may react with either the workpiece, the electrode (for welding) or a flux. However it is important that the heat affected zone remains substantially as caused by the laser alone. Significant spreading of the zone may occur if a jet of very hot gas impinges on an area which is larger than and includes the point of incidence of the laser beam on the workpiece and, for this reason, when a gas jet is used the gas temperature at the nozzle exit must be less than 1500° C. and preferably less than 1230° C., that is the transition point for steels where changes in the nature of steel occur. Where two arcs are used two gas jets may be provided.

According to a second aspect of the present invention there is provided apparatus for treating a workpiece, including a mechanism for projecting a laser beam on to a workpiece, and a mechanism for striking an arc between an electrode and the heat affected zone created, in operation, by the laser beam in the workpiece.

The mechanism for striking the arc is positioned to strike the arc on the same side of the workpiece as the laser beam unless the expected workpiece is thin enough to allow the heat affected zone to extend to an opposite surface, when the mechanism for striking an arc may be positioned to strike the arc to the zone on this opposite surface. Two electrodes may then be used to strike arcs to both sides of the workpiece.

Again, for cutting or welding, mechanisms for relatively moving the laser beam and the workpiece while maintaining the arc or arcs at the heat affected zone are required. When such mechanisms are provided the apparatus can be used for manipulating an arc.

Preferably mechanisms are also provided for projecting a jet of gas from a nozzle at the point. The gas may be inert or may react with the workpiece, or, for welding, the electrode or a flux but the temperature of the gas must be below 1500° C. at the nozzle exit. As before where two arcs are used two gas jets may be provided.

The magnetic mechanisms or the gas jet, when present, may be used to deflect the plasma away from the laser beam except at or near the arc root, so that masking of the point of incidence of the laser beam on the workpiece by the plasma is reduced. Where magnetic mechanisms are used a magnetic field is set up which reacts with the current in the arc exerting a force which moves the arc and plasma away from the laser beam except at the point of incidence. Secondary gas jets may also be used to blow the plasma to one side.

Additional penetration when cutting or drilling is possible if the laser beam strikes at a slight angle to the normal to the workpiece, thereby reducing reflection or absorption in the arc plasma.

The heat affected zone created by the laser beam naturally provides a "hot spot" which often acts as an arc root so that when a suitable voltage relative to the workpiece is applied to the electrode the arc tends to be between the point and the electrode. The laser induced plasma acts as a guide for the direction and shape of the arc discharge. The arc geometry and stability is changed by following the plasma, the size of the arc root often being affected by the heat affected zone in one or, where two arcs are operated, two workpiece surfaces, and in particular being narrower than in the absence of laser induced heat affected zone. Hence, in cutting, the quality of the cut is improved as compared with conventional arc cutting. The arc follows the laser beam at high speed and avoids the usual intermittant jumps which occur in the absence of the laser beam. In fact the root of an arc can be guided, over a limited range, by movement of the laser beam so that the method of the first aspect of the invention may, as stated, be regarded as one of manipulating an arc. It is expected that the method will provide useful in manufacturing and in equipment operation where it is desirable for arc roots to follow a certain path.

The method and apparatus of the invention may be used for surface hardening of metals such as steel where that part of the workpiece surface on which the laser beam and the arc are incident are temperature cycled to produce hardening.

In addition the method and apparatus of the invention may be used for surface alloying, or surface coating. In the former an alloy powder such as stellite is sprinkled over the surface, and the laser beam and arc are applied to melt the workpiece surface where they are incident to form a surface alloy in this region. In one example of surface coating, one or more powders are sprinkled on to the surface and are melted by the laser beam and the arc. However the melted material does not alloy with the workpiece material significantly.

Gas jets are not usually used in surface hardening or alloying according to the invention except for deflecting the plasma, shielding the electrode and protecting the laser lens.

Surface hardening, surface alloying and surface coating according to the invention have the advantage that the area treated can be very well localized, for example the teeth only of a hacksaw blade may be treated.

BRIEF DESCRIPTION OF THE DRAWING

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 2 shows a second embodiment of the invention in which the electrode, the laser beam and the oxygen jet are separate from one another, FIG. 3 shows a third embodiment of the invention in which the electrode, a laser beam and the oxygen jet are separate from one another.

DETAILED DESCRIPTION OF THE PREFERRED EMBODIMENTS

Figure 1:
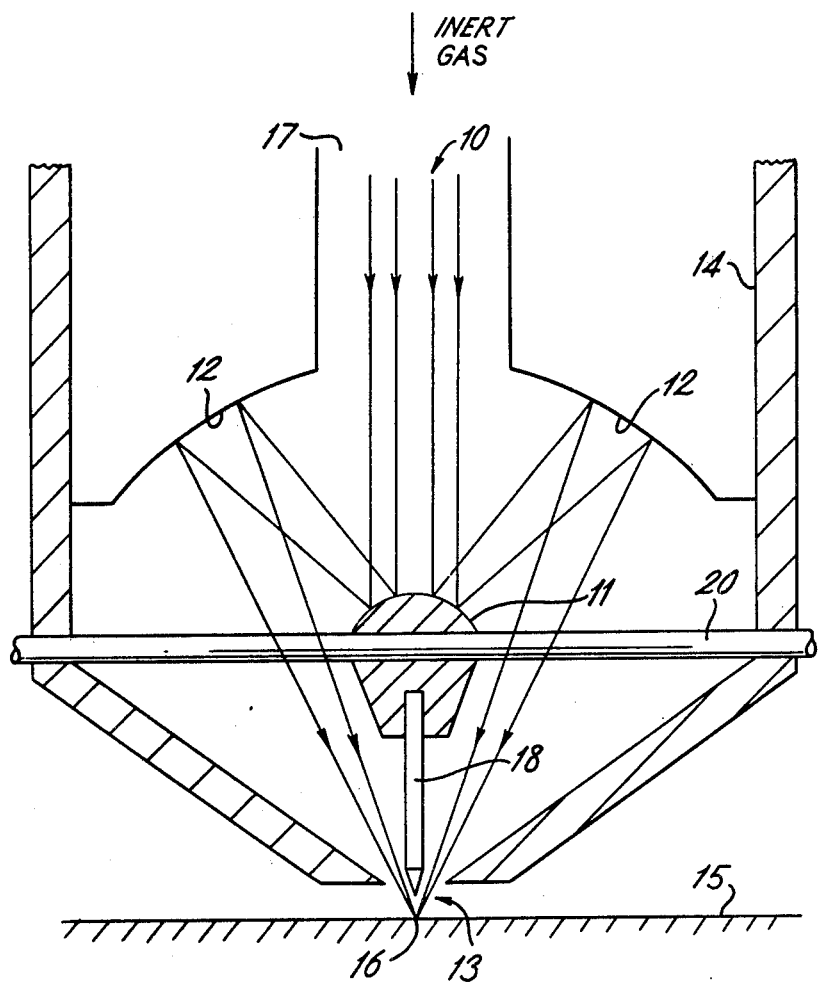
FIG. 1 shows a first embodiment of the invention in which an arc is struck between a workpiece and an electrode positioned within a nozzle through which a laser beam and inert gas are projected on to the workpiece.

In FIG. 1 a laser beam 10 is projected from a laser (not shown) through an aperture 17 in a concave mirror 12 on to a convex mirror 11 where it is reflected to the mirror 12 and thence through a nozzle 13 in a housing 14. Water cooling is provided for the mirror 12. The laser beam is incident on a workpiece 15 where a heat affected zone is created at a point 16. Here the workpiece material may vaporize forming a plume of gas and/or plasma. Additionally a small pool of liquid workpiece material may form round the point 16. When welding, the two workpieces which are to be joined are brought together at a point similar to the point 16.

For welding, surface hardening, surface alloying, or surface coating, inert gas is pumped through the aperture 17 and emerges through the nozzle 13 where it blows away the vaporized workpiece material and generally allows the laser beam access to the point 16.

In order to apply further energy to the workpiece in the form of electrical power, an arc is struck between an electrode 18 and the point 16. A suitable voltage is applied between the workpiece 15 and a rod 20 which supports both the electrode 18 and the mirror 11. A path for electric current exists between the rod 20 and the electrode 18. The workpiece 15 may be either positive or negative with respect to the electrode 18. Any arc struck between the electrode 18 and the workpiece 15 will often tend to have its root on the workpiece at the point 16 where a pool of vaporized or molten material and plasma exists.

The arrangement of FIG. 1 may be used for cutting using oxygen in place of the inert gas, the electrode 18 is then preferably shrouded, and shielded with inert gas.

An arrangement for cutting or drilling using a reactive gas such as oxygen or chlorine, which takes part in an exothermic reaction, is shown in FIG. 2. The laser beam 10 is focussed at the point 16 on the workpiece 15 by means of a lens 22 which may, for example, be made of potassium chloride, germanium or gallium arsenide, zinc selenide of cadmium telluride.

The reactive gas passes through an inlet 23 into a housing 24 having a nozzle 25 which is, in operation, just above the point 16. In this arrangement a water cooled electrode 26, for example of tungsten, is surrounded by a gas shield 27 shown in cross-section. In order to prevent the reactive gas from attacking the electrode 26 when an arc is struck between the electrode and the point 16, inert gas is passed into the shield 27 through an inlet 28. As before gas passing through the nozzle 25 scavenges the area around the point 16 as well as reacting with the workpiece.

In the arrangement of FIG. 2 there are thus three sources of heat for cutting or drilling: the laser beam, the reaction between the gas, the workpiece and the arc struck between the point 16 and the electrode 26. The arrangement may also be used for welding where additional heat is required. However, more usually an inert gas is substituted for the reactive gas and the shield 27 is omitted.

Where workpieces are being welded a consumable electrode may be used as the electrode 26. The whole electrode system may be similar to that used in MIG or TIG.

In an arrangement similar to that of FIG. 2 the electrode 26, with or without water cooling, and its shielding enclosure 27 are positioned outside the housing 24 with the tip of the electrode adjacent to the nozzle 25.

In the arrangement shown in FIG. 3 the laser beam 10 is focussed on the workpiece 15 at the point 16 using a lens 22, and as before the electrode 26 is shielded by an inert gas directed by a gas shield 27. Again in FIG. 3 the electrode 26 may be used as in a MIG or TIG system and is preferably water cooled. However in FIG. 3 the reactive gas for cutting, drilling and occasionally welding, shown in this example as oxygen, is projected towards the point 16 from a nozzle 30 having an inlet 31.

The jet from the nozzle 30 blows the plume of vaporized material and plasma towards the electrode 26 thus helping to reveal the point 16 to the laser beam while permitting electric power to be ducted to this point. The exact blowing direction of the oxygen jet for maximum efficiency of energy transfer is found empirically. The nozzle 30 also performs these functions, if in welding or surface treatment the oxygen is replaced by an inert gas.

Figure 4:
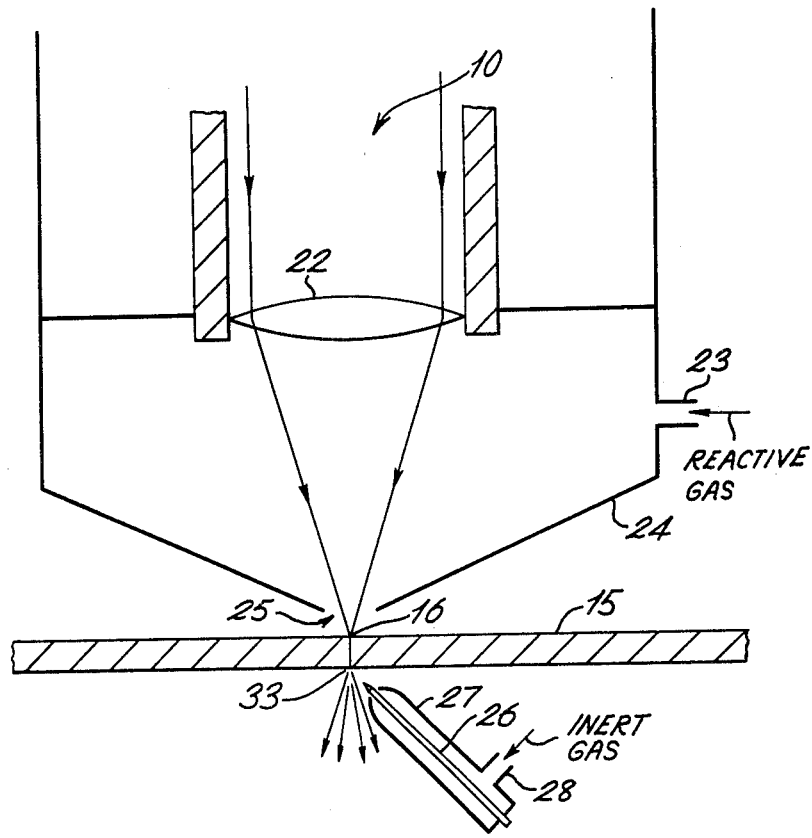
FIG. 4 shows a cross-section of a fourth embodiment of the invention in which the laser beam and the arc are on opposite sides of the workpiece.

In the arrangement shown in FIG. 4, where the same designations have been used as in FIG. 3 for members performing the same functions, the electrode 26 shielded by inert gas is positioned to strike an arc on the opposite side of the workpiece 15 from the laser beam. The arc is struck to a point 33 where the heat affected zone created by the laser beam appears on the lower side of the workpiece. The additional heat from the arc at the point 33 keeps the workpiece slag (that is molten metal or metal compound for a metal workpiece) in a state which allows it to be blown clear using a jet such as that from the nozzle 30 of FIG. 3. Thus access for the arc is achieved in cutting or full penetration welding. In addition there is no blocking of the laser beam by the arc induced plasma but a nozzle may be provided to allow the plume produced by the laser to be blown from the upper surface. Both upper and lower nozzles may supply reactive or inert gas.

In FIG. 4, the workpiece 15 moves towards the left of the figure with respect to the electrode 26 and the laser beam 10, and the electrode 26 is positioned with its tip slightly ahead of the point at which the heat affected zone created by the laser beam appears on the lower side of the workpiece. Further, the axis of the electrode 26 is in the plane of the cut or weld, or the plane of a tangent to the cut or weld at the point on the lower side of the workpiece, with the axis of the electrode making an acute angle with that part of the lower surface of the workpiece which has not yet been welded or cut.

Figure 5:
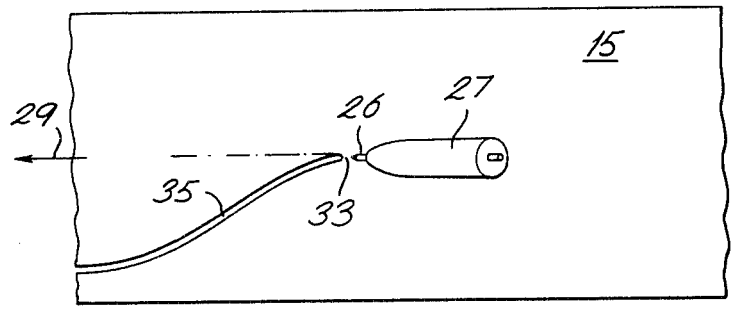
FIG. 5 shows a view of the workpiece of the fourth embodiment from below while cutting is in progress.

FIG. 5 shows the arrangement of FIG. 4 from below the workpiece when cutting is in progress, a cut or kerf 35 being shown in relation to the electrode 26. The direction of movement of the workpiece 15 relative to the other components is shown by the arrow 29. In the electrode position shown the arc roots on the said point on the lower surface of the workpiece and does not lock on to any molten waste material or slag from the cut or weld. In general the desired arc rooting can be obtained when the tip of the electrode is just ahead of, but spaced from the current point of cutting or welding, and preferably when the axis of the electrode makes an acute angle with that part of the lower or upper surface of the workpiece which is on that side of a line at right angles to a tangent to the cut or weld at the current point of cutting or welding, which is remote from the completed cut or weld.

A further gas shielded electrode (not shown) as shown in FIG. 3 may be used with the apparatus of FIG. 4 to strike a further arc on the upper surface of the workpiece 15 at the point 16. A nozzle (not shown) for supplying reactive or inert gas and/or blowing away the plume may also be provided.

In one mode of operation of the arrangements of FIGS. 2, 3 and 4 a fluid flow balance is maintained to ensure that the electrode is shrouded in an inert gas while the workpiece is covered by a separate gas stream which is a slow moving inert gas for use, for example, in welding, surface alloying or surface hardening and which is fast flowing oxygen, possibly supersonic, for cutting or drilling.

For cutting and welding relative movement between the workpiece and the laser beam and arc is required. Any of the many known arrangements for providing such relative movement may be used. For example in making a cut the laser and electrode may be kept stationary and the workpiece moved under the electrode on a table perhaps under the control of a lead screw. Where welding is carried out the two workpieces are clamped side by side along the projected weld on the table.

Since the arrangements of FIGS. 1 to 4 are intended to be general embodiments, the workpiece 15 is not shown, for example, as being partially cut or as made up of two portions being welded, rather its position and general form only are shown.

For surface hardening, surface alloying and surface coating the relative movement must be such that the point of incidence visits every part of the surface portion to be treated. Obviously, many modifications and variations of the present invention are possible in light of the above teachings. It is therefore to be understood that within the scope of the appended claims, the invention may be practiced otherwise than as specifically described herein.

I claim:

1. A method for treating workpiece means comprising one or more workpieces, including projecting a beam of light from a laser on to the workpiece means, striking an arc between, an electrode and the workpiece means, and maintaining the arc between the electrode and a heat affected zone created by the laser beam in the workpiece means, the laser beam an the arc existing concurrently for a substantial time in which workpiece treatment is carried out.

2. A method for treating workpiece means comprising one or more workpieces, including projecting a beam of light from a laser on the workpiece means, and striking an arc between an electrode and a heat affected zone created by the laser beam in the workpiece means wherein the heat affected zone extends through the workpiece means to an opposite surface thereof from the surface on which the laser beam is incident, and the arc is struck to the said zone on the said opposite surface.

3. A method according to claim 2 wherein arcs are struck to the heat affected zone on the two said surfaces.

4. A method of treating a workpiece or manipulating an arc according to claim 1 including so causing relative movement between the said zone and the workpiece means while maintaining the arc with the arc roots at the said zone that the treatment or arc manipulation is carried out as required.

5. A method of surface alloying according to claim 1 including applying a material, to be alloyed with a portion of the surface of the workpiece means, to the said portion and at the same time or after so causing relative movement between the said zone and the workpiece means that the said zone visits every point in the area to be surface alloyed.

6. A method according to claim 1 wherein a jet of gas is directed from a nozzle towards the heat affected zone on the surface of the workpiece means which receives the laser beam, the temperature of the gas at the nozzle exit being less than 1500° C.

7. A method of cutting, drilling or welding according to claim 6 wherein an exothermic reaction takes place between the gas and the workpiece means.

8. A method of welding according to claim 6 using a consumable electrode, wherein an exothermic reaction takes place between the electrode and the gas.

9. A method according to claim 1 including deflecting away from the laser beam at least part of a plume of gaseous materials and/or particles which is emitted from the point of incidence of the laser beam on the workpiece means.

10. A method of cutting or welding according to claim 4, wherein the electrode has an end portion, including maintaining the end portion nearest to the workpiece means at a point in the workpiece means where cutting or welding is just about to take place.

11. A method according to claim 10 wherein the electrode used is elongated, including so positioning the electrode that its longitudinal axis makes an acute angle with a major surface of the workpiece means on that side of a line at right angles to a tangent to the weld or cut at the current point of cutting or welding, which is remote from the currently completed part of the cut or weld.

12. Apparatus for treating workpiece means, including means for projecting a laser beam on to workpiece means comprising one or more workpieces, and means for providing an arc between an electrode and the heat affected zone created, in operation, by the laser beam in the workpiece means and for maintaining the arc for at least a substantial time while the laser beam is projected on to the workpiece means.

13. Apparatus for treating workpiece means, including means for projecting a laser beam onto workpiece means comprising one or more workpieces, and means for striking an arc between an electrode and a heat affected zone created, in operation, by the laser beam in the workpiece means in which the heat affected zone extends through the workpiece means to an opposite surface thereof from the surface at which the laser beam is directed, wherein the electrode is positioned to strike an arc to the said zone in the said opposite surface.

14. Apparatus according to claim 13 including a further electrode and means for striking an arc between the further electrode and the heat affected zone.

15. Apparatus for treating workpiece means or manipulating an arc according to claim 12 including means for causing relative movement between the said zone and the workpiece means while maintaining the arc or arcs with the arc roots at the said zone.

16. Apparatus according to claim 12 including means for projecting a jet of gas from a nozzle towards the heat affected zone on the surface of the workpiece means which receives the laser beam, the temperature of the gas at the nozzle exit being less than, 1500° C.

17. Apparatus according to claim 16 wherein the gas is exothermically reative with the workpiece means.

18. Apparatus according to claim 12 including an enclosure for the or each electrode, the or each enclosure having an inlet port for an inert gas and an aperture for allowing an arc to be struck to the workpiece means.

19. Apparatus according to claim 12 including means for deflecting away from the laser beam at least part of a plume of gaseous materials and/or particles which, in operation is emitted from the point of incidence of the laser beam on the workpiece means.

20. Apparatus according to claim 19 for use with apparatus in which, in operation, an arc is struck on the same side of the workpiece means as the laser beam, wherein the deflection means includes magnetic means for applying a magnetic field to deflect the arc away from the laser beam except at the said point of incidence.

21. Apparatus according to claim 16 wherein the means for projecting a jet of gas or further such means are positioned to deflect the plume of gaseous materials and/or particles which is emitted from the point of incidence of the laser beam on the workpiece means away from the laser beam.

22. Apparatus according to claim 16 wherein the electrode is elongated and is mounted at least partially within a chamber having a nozzle, the end of the electrode from which the arc is struck being positioned adjacent to the nozzle, the chamber having a window for the laser beam, and the apparatus includes means for directing the laser beam through the nozzle.

23. Apparatus according to claim 22 wherein the electrode, which is at least partially within the chamber, and, in operation, a portion of the laser beam are substantially coaxial with the nozzle, and wherein the means for directing the laser beam includes a convex reflector coaxial with, and positioned in, the said portion of the laser beam and a concave reflector coaxial with, and having an aperture for, the said portion of the laser beam, the reflectors being so positioned that light from the laser passes first through the aperture in the concave reflector, is reflected from the convex reflector and is then reflected from the concave reflector through the nozzle.

24. Apparatus according to claim 22 wherein the aperture of the enclosure is adjacent to the nozzle.

25. Apparatus according to claim 22 including means for causing relative movement between the said zone and the workpiece means while maintaining the arc with arc roots in said zone, wherein the electrode has an end portion so positioned in relation to the means for projecting a laser beam that in operation the end portion can be nearest to the workpiece means at a point in the workpiece means where, in operation, treatment of the workpiece means is about to take place.

26. Apparatus according to claim 25, wherein the apparatus is constructed to receive the workpiece means in a predetermined position, and the electrode is elongated and so positioned that, in operation, its longitudinal axis can make an acute angle with a major surface of the workpiece means on that side of a line at right angles to a tangent to a line of treatment of the workpiece at the current point of treatment, which is remote from that part of the workpiece which has been treated, the line of treatment being a line in the workpiece along which treatment has already been carried out.

27. A method according to claim 1 wherein a jet of gas is directed from a nozzle towards the heat affected zone on a surface of the workpiece means which is separate and distinct from that surface which receives the laser beam, the temperature of the gas at the nozzle exit being less than 1500° C.

28. A method according to claim 1 wherein gas jets from first and second nozzles are directed at the heat affected zone in first and second surfaces of the workpiece means, respectively, the temperature of the gas at the nozzle exits being less than 1500° C.

29. A method of cutting, drilling or welding according to claim 6 wherein an exothermic reaction takes place between the gas and a flux applied to the workpiece means.

30. Apparatus according to claim 12 including means for projecting a jet of gas from a nozzle towards the heat affected zone on a surface of the workpiece means which is separate and distinct from that surface which receives the laser beam, the temperature of the gas at the nozzle exit having less than 1500° C.

31. Apparatus according to claim 12 including means for projecting jets of gas from first and second nozzles, towards the heat affected zone in first and second surfaces of the workpiece means, respectively, the temperatures of the gas at the nozzle exits being less than 1500° C.

32. Apparatus according to claim 16 wherein the gas is exothermically reactive with a flux expected to be applied to the workpiece means.

33. Apparatus according to claim 26 wherein the line of treatment is the line along which cutting has been carried out.

* * * * *